US006061323A

United States Patent [19]
Jerman et al.

[11] Patent Number: 6,061,323
[45] Date of Patent: May 9, 2000

[54] DATA STORAGE SYSTEM HAVING AN IMPROVED SURFACE MICRO-MACHINED MIRROR

[75] Inventors: John H. Jerman, Palo Alto; Joseph Drake, Mountain View; Joseph E. Davis, Morgan Hill; Jeffrey P. Wilde, Los Gatos; Kurt E. Petersen, San Jose, all of Calif.

[73] Assignee: Seagate Technology, Inc., Scotts Valley, Calif.

[21] Appl. No.: 08/844,207

[22] Filed: Apr. 18, 1997

Related U.S. Application Data

[60] Provisional application No. 60/022,775, Jul. 30, 1996, provisional application No. 60/023,476, Aug. 6, 1996, and provisional application No. 60/025,801, Aug. 27, 1996.

[51] Int. Cl.[7] .................................................. G11B 7/00
[52] U.S. Cl. ..................... 369/112; 369/119; 369/44.23
[58] Field of Search ................................. 369/112, 44.23, 369/44.24, 118, 119, 117, 44.12; 359/291, 224, 230, 298

[56] References Cited

U.S. PATENT DOCUMENTS

| 3,737,236 | 6/1973 | Borrelli ................................. 356/118 |
| 4,003,059 | 1/1977 | Sugiura et al. ......................... 346/108 |
| 4,175,832 | 11/1979 | Umeki ................................... 350/285 |

(List continued on next page.)

FOREIGN PATENT DOCUMENTS

| 0331331A2 | 9/1989 | European Pat. Off. . |
| 0 460 889 A2 | 1/1991 | European Pat. Off. . |
| 0 419 853 A2 | 4/1991 | European Pat. Off. . |
| 0 460 890 A2 | 12/1991 | European Pat. Off. . |
| 0 469 293 A1 | 2/1992 | European Pat. Off. . |
| 0 539 889 A2 | 5/1993 | European Pat. Off. . |
| 0 588 344 A2 | 3/1994 | European Pat. Off. . |
| 01614101 | 9/1994 | European Pat. Off. . |
| 0650133A2 | 4/1995 | European Pat. Off. . |
| 0 664 470 A2 | 7/1995 | European Pat. Off. . |
| 0 715 302 A1 | 11/1995 | European Pat. Off. . |
| 0 712 121 A2 | 5/1996 | European Pat. Off. . |
| 59-117180 | 6/1984 | Japan . |
| 2016744 | 9/1979 | United Kingdom . |
| PCT/GB94/01984 | 3/1994 | WIPO . |
| WO 95/02243 | 1/1995 | WIPO ................................. 369/112 |
| PCT/US95/12018 | 5/1995 | WIPO . |
| WO95/13638 | 5/1995 | WIPO . |

OTHER PUBLICATIONS

Daneman, et al., "Laser–to–Fiber Coupling Module Using A Micro–Machined Alignment Mirror", IEEE Photonics Technology Letter, vol. 8, No. 3, Mar. 1996, pp. 396–298.

Boysel, et al., "Integration of Deformable Mirror Devices with Optical Fiber and Waveguides", SPIE vol. 1793, Integrated Optics and Microstructures, pp. 34–39.

Linder, et al. "Photolithography in Anisotropically Etched Grooves" IEEE 9th Annual Int. Workshop on Micro Electro Mechanical Systems Feb. 11–15, 1996 pp. 38–43.

Barnes, et al. "Use of Optical Fiber Heads for Optical disks" Applied Optics vol. 25 No. 22 Nov. 1986 pp. 4010–4012.

Suhara, "Integrated–Optic Disk Pickup Devices: Hybrid to Monolithic Integration" Int. Symposium on Optical Memory & Optical Data Storage Jul. 1996 pp. 284–286.

Jerman, "Recent Trends in Silicon Micromachining Technology" SPIE vol.2639 1995 pp. 3–8.

Dickensheets, et al. "Micromachined Scanning Confocal Optical Microscope" Optics Letters vol. 21 No. 10 May 1996 pp. 764–766.

(List continued on next page.)

*Primary Examiner*—Nabil Hindi
*Attorney, Agent, or Firm*—Flehr Hohbach Test Albritton & Herbert LLP

[57] ABSTRACT

A data storage and retrieval system includes a micro machined mirror assembly ($\mu$MM) having a plate layer defining a surface micro machined mirror supported at a central axis by two opposed torsional frame members connected to inner edges of a surrounding frame.

32 Claims, 8 Drawing Sheets

U.S. PATENT DOCUMENTS

| | | | |
|---|---|---|---|
| 4,581,529 | 4/1986 | Gordon | 250/227 |
| 4,740,951 | 4/1988 | Lizet | 370/3 |
| 4,799,210 | 1/1989 | Wilson | 369/110 |
| 4,945,400 | 7/1990 | Blonder et al. | 357/74 |
| 5,033,043 | 7/1991 | Hayakawa | 369/121 |
| 5,105,408 | 4/1992 | Lee | 369/44.15 |
| 5,119,361 | 6/1992 | Tanabe | 369/121 |
| 5,152,597 | 10/1992 | Barnard | 359/130 |
| 5,153,870 | 10/1992 | Lee | 369/111 |
| 5,197,050 | 3/1993 | Murakami | 369/13 |
| 5,199,090 | 3/1993 | Bell | 385/33 |
| 5,212,582 | 5/1993 | Nelson | 359/224 |
| 5,218,582 | 6/1993 | Marchant | 369/14 |
| 5,224,088 | 6/1993 | Atiya | 369/97 |
| 5,233,456 | 8/1993 | Nelson | 359/214 |
| 5,233,587 | 8/1993 | Asano | 369/44.42 |
| 5,243,241 | 9/1993 | Wang | 310/36 |
| 5,245,491 | 9/1993 | Horie | 360/114 |
| 5,253,245 | 10/1993 | Rabedeau | 369/119 |
| 5,255,260 | 10/1993 | Yamada | 369/199 |
| 5,295,122 | 3/1994 | Murakami | 369/13 |
| 5,296,988 | 3/1994 | Fujino | 360/110 |
| 5,313,442 | 5/1994 | Ohtsuka | 369/44.16 |
| 5,325,116 | 6/1994 | Sampsell | 346/108 |
| 5,327,416 | 7/1994 | Lee | 369/199 |
| 5,331,454 | 7/1994 | Hornbeck | 359/224 |
| 5,351,229 | 9/1994 | Brezoczky | 369/99 |
| 5,422,872 | 6/1995 | Hsu et al. | 369/97 |
| 5,432,763 | 7/1995 | Campbell | 369/44.19 |
| 5,444,566 | 8/1995 | Gale | 359/291 |
| 5,481,386 | 1/1996 | Shimano | 369/44.12 |
| 5,504,731 | 4/1996 | Lee | 369/112 |
| 5,519,677 | 5/1996 | Shibata | 369/44.16 |
| 5,536,926 | 7/1996 | Ikeda et al. | 235/462 |
| 5,563,871 | 10/1996 | Bargenhuff et al. | 369/119 |
| 5,625,483 | 4/1997 | Swartz | 359/224 |
| 5,737,302 | 4/1998 | Kasahara | 369/118 |
| 5,742,419 | 4/1998 | Dickensheets et al. | 359/201 |

OTHER PUBLICATIONS

Howe, "Polysilicon Integrated Microsystems: Technologies and Applications" 8th Int. Conference on Solid State Sensors and Actuators Jun. 1995 pp. 43–46.

Re nard, et al. "Magneto Optical Reading and Writing Integrated Heads: A Way to a Multigigabyte Multi–Rigid–Disk Drive" SPIE vol. 1499 1991 pp. 238–246.

Opsasnick, et al. "Optical Fibers for Magneto–Optical Recording" SPIE vol. 1499 1991 pp. 238–246.

Coughlin, et al. "Design Trends in Head/Gimbal Assemblies for Hard–Disk Drives" Data Storage May 1995 pp. 23–31.

Petersen, "Silicon Torsional Scanning Mirror" IBM J. Res. Dev. vol. 24 No. 5 Sep. 1980 pp.631–637.

Garvey, et al. "Single–Mode Nonlinear–Optical Polymer Fibers" J. Optical Society Am. B. vol. 13 No. 9 Sep. 1996 pp. 2017–2023.

Petersen, "Silicon as a Mechanical Material" Proceedings of the IEEE vol. 70 No.5 May 1982 pp. 420–457.

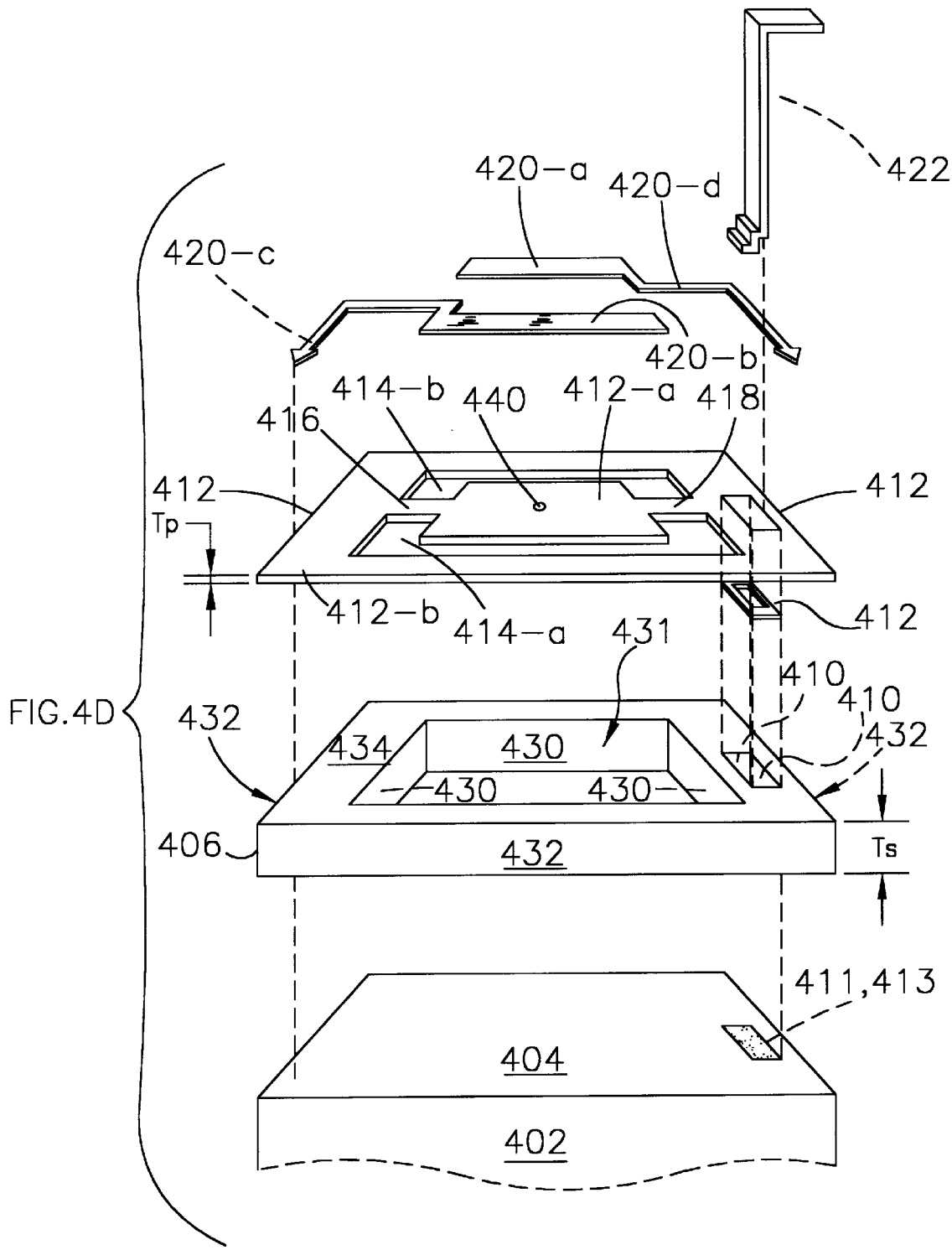

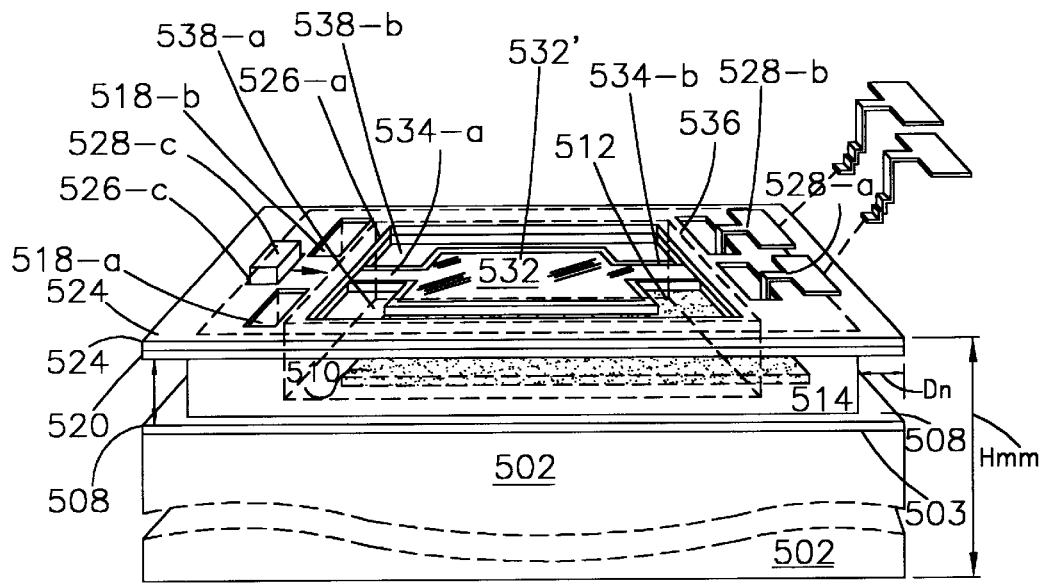
FIG. 5A
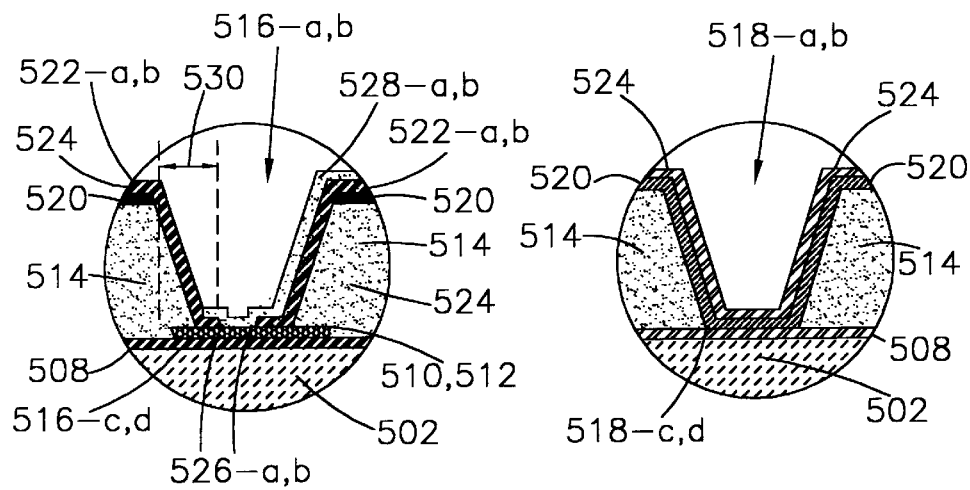
FIG. 5B
FIG. 5C

DATA STORAGE SYSTEM HAVING AN IMPROVED SURFACE MICRO-MACHINED MIRROR

CROSS REFERENCE TO RELATED APPLICATIONS

This application claims benefit of: Provisional Application Serial No. 60/022,775, entitled "A Data Storage And Retrieval System Based on Flying Magneto-Optical Head," filed on Jul. 30, 1996; Provisional Application Serial No. 60/023,476, entitled "A Data Storage And Retrieval System Based on A Flying Magneto-Optical Head," filed on Aug. 6, 1996; and Provisional Application Serial No. 60/025,801, entitled "A Data Storage And Retrieval System Based on A Flying Magneto-Optical Head," filed on Aug. 27, 1996. The subject matter of each of these related applications is incorporated herein by reference. All applications are commonly assigned. This application is being filed concurrently with U.S. Patent Application Ser. No. 08/844,208, entitled "Maximum Data Storage For Magneto-Optical System," filed on Apr. 18, 1997. All applications are commonly assigned. The subject matter of each of these related applications is incorporated herein by reference.

BACKGROUND OF THE INVENTION

1. Field of the Invention

The present invention relates generally to data storage systems having optical data tracking, storage or retrieval systems. More particularly, the present invention relates to data storage and/or retrieval systems include steerable optics.

2. Background Art

In data recording and retrieval systems that use a moving media having a varying material characteristic, detectable variations from previously encoded media locations may be retrieved using reflected incident light. Such variations may also be used in providing servo control signals for following previously recorded data tracks. For example, in a magneto-optical storage system, using a Magneto-Optical (MO) recording material deposited on a rotating disk, information may be recorded on the disk as spatial variations of magnetic domains. During readout, the magnetic domain pattern modulates art optical polarization, and a detection system converts a resulting signal from optical to electronic format.

In one type of magneto-optical storage system, a magneto-optical head assembly is located on a linear actuator that moves the head along a radial direction of the disk to position the optical head assembly over data tracks during recording and readout. A magnetic coil is placed on a separate assembly on the head assembly to create a magnetic field that has a magnetic component in a direction perpendicular to the disk surface. A vertical magnetization vector of polarity (opposite to that of the surrounding magnetic material of the disk medium) is recorded as a mark indicating zero or a one by first focusing a beam of laser light to form an optical spot on the disk. The optical spot functions to heat the magneto-optical material to a temperature near or above a Curie point (i.e., a temperature at which the magnetization may be readily altered with an applied magnetic field). A current passed through the magnetic coil orients the spontaneous vertical magnetization vector either up or down. This orientation process occurs in the region of the optical spot where the temperature is suitably high. The orientation of the magnetization mark is preserved after the laser beam is removed. The mark is erased or overwritten if it is locally reheated to the Curie point by the laser beam while the magnetic coil creates a magnetic field in the opposite direction.

Information is read back from a particular mark on the disk by taking advantage of the magnetic Kerr effect to detect a Kerr rotation of the optical polarization that is imposed on a reflected beam by the magnetization at the mark of interest, the magnitude of the Kerr rotation being determined by the material's properties (embodied in the Kerr coefficient). The sense of the rotation is measured by established differential detection schemes as being clockwise or counter-clockwise depending on the direction of the spontaneous magnetization at the mark of interest.

Conventional magneto-optical heads, while presently providing access to magneto-optical disks with areal densities on the order of 1 Gigabit/in$^2$, tend to be based on relatively large optical assemblies which make the physical size and mass of the head rather bulky. Consequently, the speed at which conventional magneto-optical heads are mechanically moved to access new data tracks on a magneto-optical storage disk is slow. In addition, the physical size of the prior art magneto-optical heads limits the spacing between magneto-optical disks. Consequently, because the volume available in standard height disk drives is limited, magneto-optical disk drives have not been available as high capacity commercial products. For example, a commercial magneto-optical storage device presently available provides access to only one side of a 130 mm double sided 2.6 ISO gigabyte magneto-optical disk, a 40 ms disk access time, and a data transfer rate of 4.6 MB/Sec.

N. Yamada (U.S. Pat. No. 5,255,260) discloses a low-profile flying optical head for accessing an upper and lower surface of a plurality of optical disks. The flying optical head disclosed by Yamada describes an actuating arm having a static (i.e., fixed relative to the arm) mirror or prism mounted thereon, for delivering light to and receiving light from a phase-change optical disk. While the static optics described by Yamada provides access to both surfaces of a plurality of phase-change optical disks contained within a fixed volume, use of the optics disclosed by Yamada is inherently limited by how small the optics can be made. Consequently, the number of optical disks that can be manufactured to function within a given volume is also limited. Another shortcoming relates to the use of static optics. This approach imposes a limit on track servo bandwidth by requiring the entire optical head assembly to move in order to change the location of a focused optical spot. This same limitation applies to the flying magneto-optical head disclosed by Murakami et al. in U.S. Pat. No. 5,197,050. In general, the larger the mass of the element used to perform fine track servoing, the lower the servo bandwidth becomes and the lower the track density that can be read or written.

A method for moving a folding prism or mirror with a galvanometer actuator for fine tracking has been disclosed by C. Wang in U.S. Pat. No. 5,243,241. The galvanometer consists of bulky wire coils and a rotatable magnet mounted on a linear actuator arm attached to a flying magneto-optical head, but not mounted on the slider body itself. This design limits the tracking servo bandwidth and achievable track density due to its size and weight. Its complexity also increases the cost and difficulty of manufacture.

Miniature torsional scanning mirrors have been described, viz, "Silicon Torsional Scanning Mirror" by K. Petersen, IBM J. Res. Develop., Vol. 24, No. 5 Sept 1980, pp. 631–637. These mirrors are generally prepared using procedures developed in the semiconductor processing arts. Petersen describes a torsion mirror structure having a 134

μm thick silicon wafer defining a distal frame suspending a central silicon mirror element suspended by lateral torsion members therebetween. The lateral mirror dimensions are about 2.1 by 2.2 mm. The mirror is bonded over a 7 to 10 μm deep etched well in a glass slide substrate, having evaporated electrodes deposited therein. The mirror is rotationally deflected by voltages applied between the mirror and the electrodes by connecting wires. Scanning angles of up to 2 degrees at a resonant operating frequency of up to 15 kHz were reported. The size and mass of the mirror limited higher operating frequency. Also, mirror distortion caused by the high dynamic torque (i.e., peak angular acceleration ) at higher frequency was a limiting factor. The high mechanical Q of prior art mirrors hinders the ability to achieve precise angular deflection vs. voltage characteristics when operating in a range close to the resonant frequency. In the prior art, control of the mirror at large deflection angles becomes problematic due to the spontaneous deflection of the mirror tip to the substrate at a critical control angle when the tip of the electrostatically deflected element approaches within about ⅓ of the way down into the etched well. See "Silicon as a Mechanical Material", K. Petersen, Proceedings of the IEEE, VOL. 70, No. 5, May 1982, pp. 446–447.

What is needed is an improved optical head that is compact and that allows an increase in the number of storage disks that can be placed within a given volume as compared to the prior art. The improved optical head should preferably provide a high numerical aperture, a reduced head mass, a very high resonance frequency tracking servo device thus producing a very fine track servo bandwidth, and be relatively easy to manufacture. Additionally, the flying optical head should improve upon: optical disk drive access times; data transfer rates; and access to, and use of, storage disk tracks.

SUMMARY OF THE INVENTION

It is an object of the invention to provide optical data storage systems with flying heads that have a steerable micro-machined mirror with a mirror flatness (on the order of less than λ/10 where λ is the wavelength of light of the optical path) over an expected operating temperature range.

Yet another object of the invention is to provide steerable micro-machined mirrors for retrieval of information, track following, and seeks from one data track to another data track independent of a movement of an actuator arm.

Still another object of the present invention is to provide optical data storage systems with flying heads having a steerable micro-machined mirror with an improved stiffness/mass ratio for lower mirror distortion during operation.

Yet another object of the present invention is to provide optical data storage systems with flying heads having a steerable micro-machined mirror with improved combinations of maximum mirror angular displacement, operating voltage range, mirror stiffness, mirror flatness and resonant frequency.

Still another object of the present invention is to provide optical data storage and tracking systems having increased volumetric data storage capacity.

Yet another object of the invention is to provide steerable micro-machined mirrors with greater margin between maximum angular deflection and critical control angle.

Yet another object of the invention is to provide steerable micro-machined mirrors with decreased tendency for mirror distortion due to thermal stress in a supporting frame.

The invention includes a micro machined mirror assembly (μMM) having a plate layer defining a surface micro machined mirror supported at a central axis by two opposed torsional frame members connected to inner edges of a surrounding frame. The plate layer is spaced away from a base substrate, and supported by, a spacer layer therebetween. Electrostatically cooperating electrodes connected to external control outputs are mounted on the mirror plate layer and the substrate. A spacer well is defined between the mirror plate and the substrate that allows the mirror to rotate about the central axis under the influence of electrostatic forces on the electrodes induced by the voltages coupled from the control outputs. Rotation of the mirror plate layer alters an impinging beam of optical light. Plate frame support contacts are provided to the base substrate through vias in surrounding spacer layer field support regions. The plate/substrate contacts are spaced sufficiently far from the mirror and torsion members, such that, the field support regions shield the mirror and torsion members from built in stresses or bi-metallic thermal stresses in the frame support layer and contacts. A multilayer deposition and annealing of a PSG spacer layer embodiment provides deeper well surface micro machined structures for improved non-critical angular displacement of larger mirrors. An embodiment of the μMM includes a silicon-rich silicon nitride mirror supporting plate layer to provide an improved match of thermal expansion coefficient between the frame, a PSG spacer layer and a silicon base substrate. Optional support ribs under the mirror provide lower mirror distortion caused by high peak mirror angular accelerations and bi-metallic thermal stresses. Thinning (back grinding) of the μMM after surface micro machining decreases the overall height of the storage system read/write head and further provides for greater magneto-optic retrieval system volumetric storage density.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein:

FIG. 4D shows an exploded view of the layers of the μMM of FIG. 4;

FIG. 5A shows a perspective view of a buried two-electrode embodiment of a μMM assembly in accordance with the present invention;

FIG. 5B shows a detail cross section of one spacer layer conductor contact via for metal to buried electrode contact of FIG. 5A;

FIG. 5C shows a detail cross section of one spacer layer attachment contact via for plate attachment to substrate contact of FIG. 5A.

DETAILED DESCRIPTION OF A PREFERRED EMBODIMENT OF THE INVENTION

Figure 1:
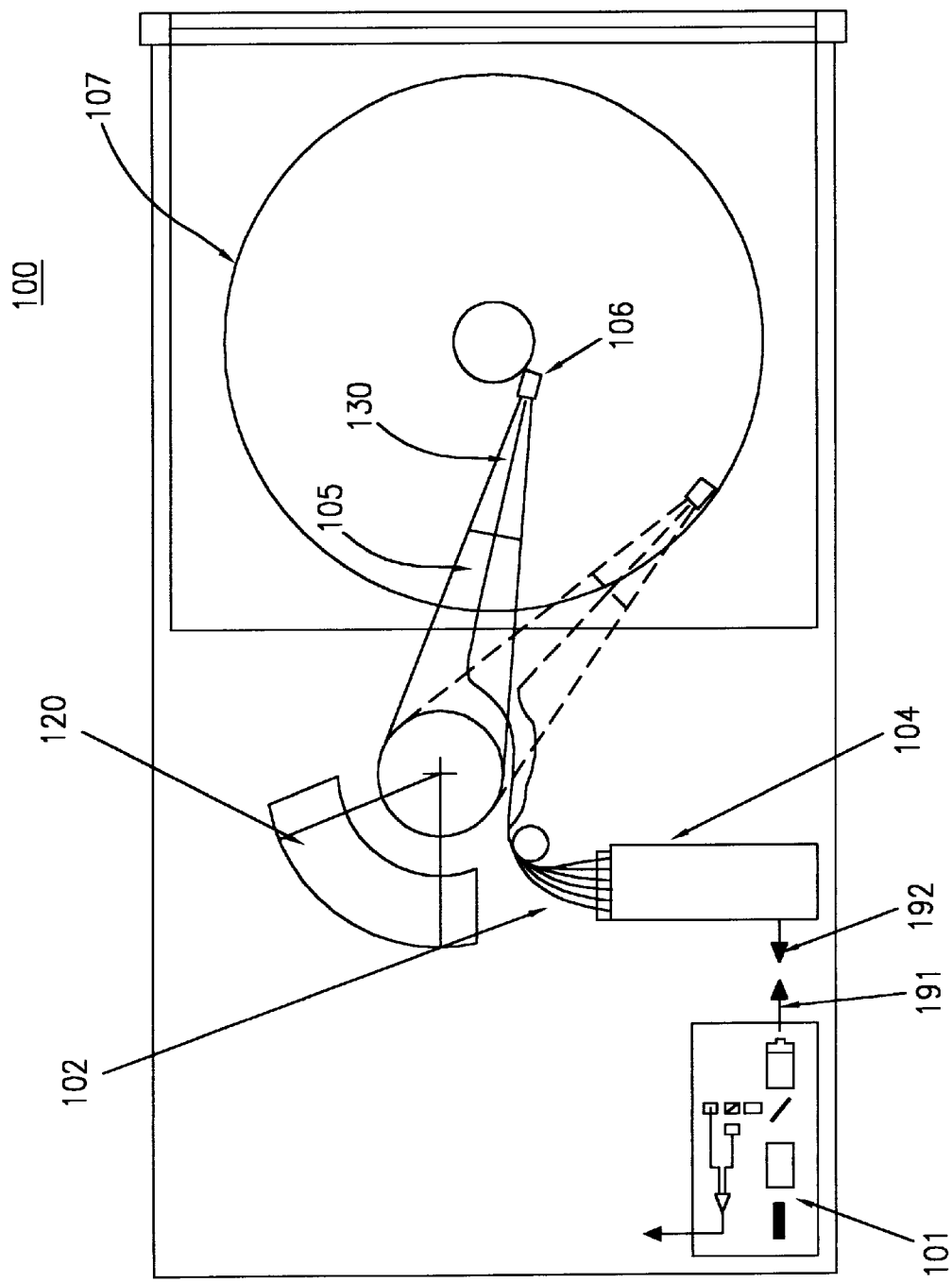
FIG. 1 illustrates one preferred embodiment of a magneto-optical storage system.

Referring in detail now to the drawings wherein similar parts of the invention are identified by like reference numerals, there is seen in FIG. 1 a diagram showing a magneto-optical data storage and retrieval system. In a preferred embodiment, a magneto-optical (MO) data storage and retrieval system 100 includes a set of Winchester-type flying heads 106 that are adapted for use with a set of double-sided MO disks 107 (one flying head for each MO disk surface). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor 195 so as to generate aerodynamic lift forces between the set of flying MO heads 106 and so as to maintain the set of flying MO heads 106 in a flying condition approximately less than or equal to 15 micro-inches above the upper and lower surfaces of the set of MO disks 107. The lift forces are opposed by equal and opposite spring forces applied by the set of suspensions 130. During nonoperation, the set of flying MO heads 106 are maintained statically in a storage condition away from the surfaces of the set of MO disks 107.

System 100 further includes: a laser-optics assembly 101, an optical switch 104, and a set of single-mode PM (polarization maintaining) optical fibers 102. In the exemplary embodiment, each of the set of single-mode PM optical fibers 102 are respectively coupled through a respective one of the set of actuator arms 105 and suspensions 130 to a respective one of the set of flying MO heads 106. Use of the optical switch 104, the set of flying heads 106, and the set of single-mode PM optical fibers 102 is described in commonly assigned U.S. patent application Ser. No. 08/844, 208, entitled "Maximum Data Storage For Magneto-Optical System," which is being filed concurrently with the present patent application on Apr. 18, 1997, and which is incorporated herein by reference.

Figure 2:
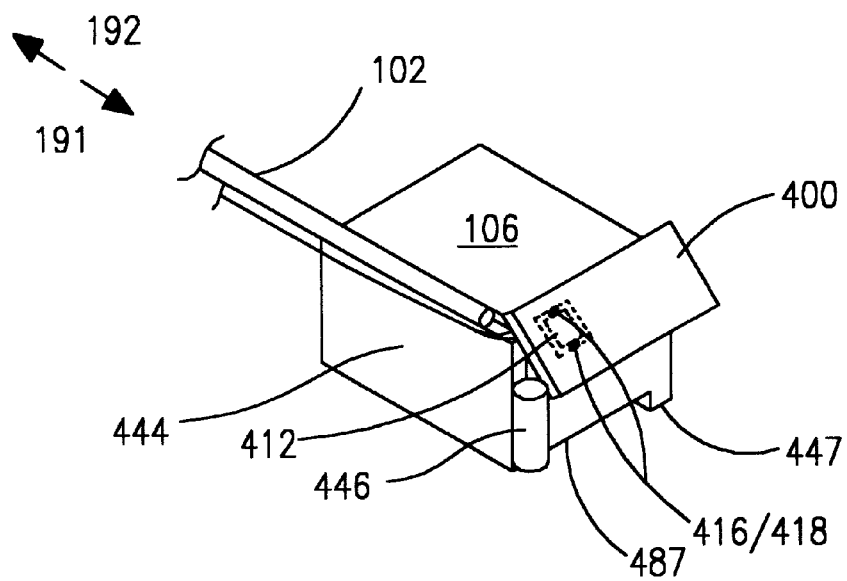
FIG. 2 shows a magneto-optical system slider head having mounted thereon one embodiment of a steerable micro-machined mirror assembly (μMM) of the present invention.
Figure 3:
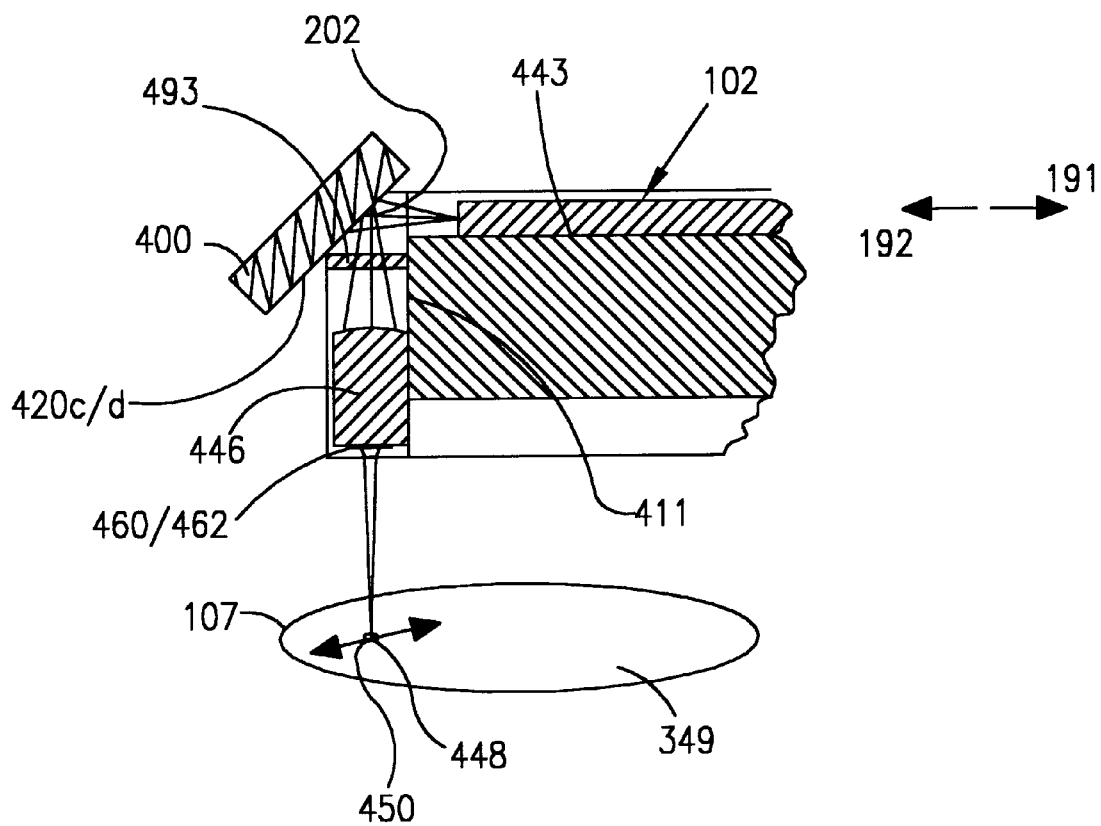
FIG. 3 illustrates a cross sectional view of the μMM assembly along a vertical plane portion through the optical fiber.

FIGS. 2 and 3 are diagrams showing the flying magneto-optical head of the magneto-optical data storage in a perspective and a side cross-sectional view, respectively. The flying MO head 106 includes: a slider body 444, an air bearing surface 447, a quarter-wave plate 493, a surface micro-machined steerable mirror assembly (μMM) 400, objective optics 446, a magnetic coil 460, and a yoke 462. The flying MO head 106 and, therefore, the slider body 444 is dimensioned to accommodate the working distances between the objective optics 446, the single-mode PM optical fiber 102, and the assembly 400. Although, slider body 444 may include industry standard "mini", "micro", "nano", or "pico" sliders, alternatively dimensioned slider bodies 444 may also be used (as determined by the aforementioned dimensional constraints of the elements used with the flying MO head 106). Accordingly, in the preferred embodiment, the slider body 444 comprises a mini slider height (889 um) and a planar footprint area corresponding to that of a nano slider (1600×2032 um).

The single-mode PM optical fiber 102 is coupled to the slider body 444 along an axial cutout 443, and the objective optics 446 is coupled to the slider body 444 along a vertical corner cutout 411. Although, in the preferred embodiment the axial cutout 443 is located along a periphery of the slider body and the vertical cutout 411 is located at a corner of the slider body 444, the axial cutout 443 and the vertical cutout 411 may be located at other positions on the flying MO head 106, for example, between the periphery and a central axis or, alternatively, along the central axis itself. Those skilled in the art will recognize that positioning the optical fiber 102 and the objective optics 446 at other than along a central axis may function to affect a center of mass of the magneto-optical head 106 and, thus, its flying dynamics. Accordingly, the point of attachment of the flying MO head 106 to the suspension may require adjustment to compensate for off-center changes in the center of mass of the magneto-optical head 106. Preferably, the cutouts 443 and 411 may be designed as channels, v-grooves, or any other suitable means for coupling and aligning the single-mode optical fiber 102 and objective optics 446 to the flying MO head 106. In the preferred embodiment, the laser beams 191 and 192 traverse an optical path (to and from the surface recording layer 349 of the MO disk 107) that includes: the single-mode PM optical fiber 102, the μMM assembly 400, the quarter-wave plate 493, and the objective optics 446.

Figure 4A:
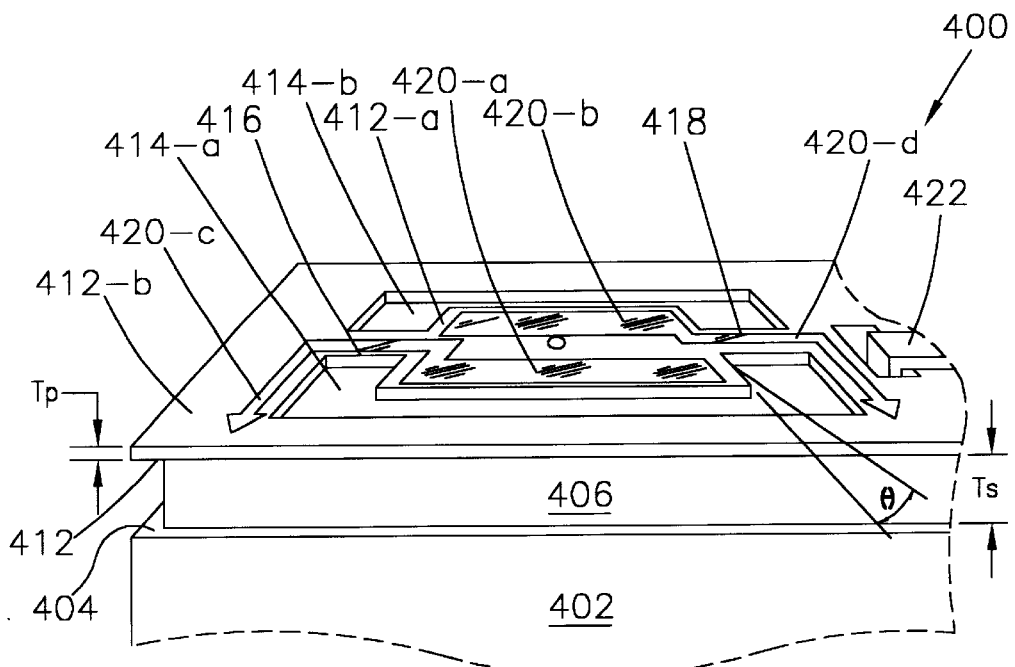
FIG. 4A shows a perspective view of one embodiment of the μMM assembly of the present invention.
Figures 4B, 4C:
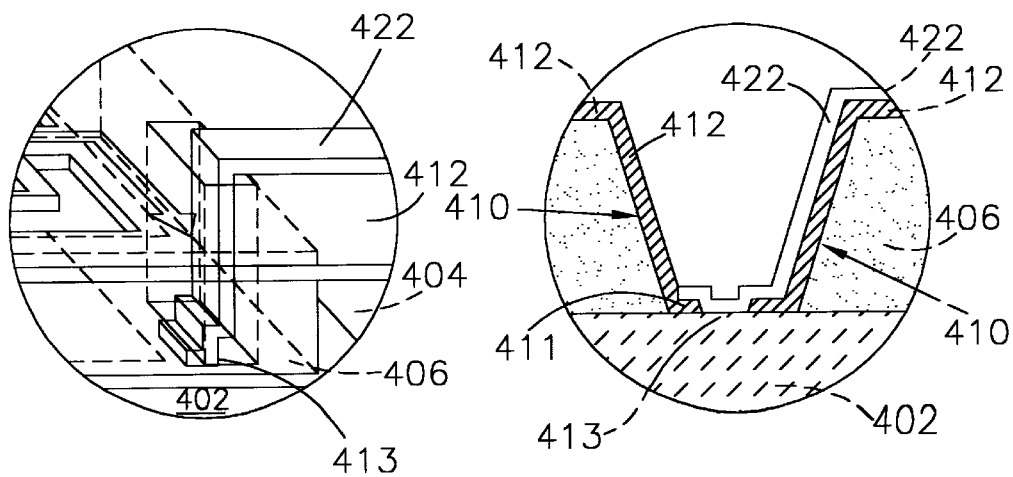
FIG. 4B shows a partial cut away view of a substrate-to-metal contact portion FIG. 4A.
FIG. 4C shows a cross section of one of the substrate-to-metal contacts of FIG. 4A.

In the preferred embodiment, the μMM assembly 400 includes a small reflective mirror plate portion 412-a (represented in FIG. 4a by dashed lines illustrating the mirror plate portion 412-a on a side of the μMM assembly 400 opposite to that which is visible). The small size and mass of the μMM assembly 400 contributes to the ability to design the flying MO head 106 with a low mass and a low profile. As used in the system 100, fine tracking and short seeks to a series of nearby tracks may be performed by rotating the mirror plate portion 412-a about a rotation axis so that the propagation angle of the outgoing laser beam 191 is changed before transmission to the objective optics 446. The mirror plate portion 412-a is rotated by applying a differential voltage to a set of conductive traces electrodes 420-c, d (FIG. 4b). The differential voltage on the electrodes creates an electrostatic force that rotates the mirror plate portion 412-a about a set of axial torsional members 416/ 418 and enables the focused optical spot 448 to be moved in the radial direction of the MO disk 107. A rotation of the mirror plate portion 412-a is used for movement of the focused optical spot 448 in an approximately radial direction 450 of the MO disk 107 for storage and retrieval of information, track following, and seeks from one data track to another data track. Coarse tracking may be maintained by adjusting a current to the rotary actuator magnet and coil assembly 120 (FIG. 1). The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, irrespective of the movement of the set of actuator arms 105 and set of suspensions 130, a set of the μMM assemblies 400 of the present invention may be used to operate independently and thus permit track following and seeks so as to read and/or write information using more than one MO disk surface at any given time. Independent track following and seeks using a set of concurrently operating μMM assemblies 400 would preferably require a set of separate respective read channel and fine track electronics and mirror driving electronics.

Turning now to FIG. 4A and 4D, there is shown one preferred embodiment of a μMM assembly 400 in accordance with the present invention. In one preferred embodiment, the μMM assembly 400 includes: a substrate base 402, which defines a first substrate surface 404. A planar spacer layer 406 is formed on the substrate surface 404 to a spacer layer thickness, Ts, of about 8 μm. In one embodiment of the invention shown in FIG. 4A, the substrate 402 is an N-type silicon wafer and the spacer 406 layer is chemical vapor deposited (CVD) phospho-silicate-glass (known in the art as PSG).

Suitable materials for the substrate 402 are silicon, specifically N-type silicon in wafer form, quartz and other relatively high-temperature glasses. Suitable substrate materials will have thermal coefficients of expansion (TCE) which match the TCE of the frame, spacer, mirror, conductor and other insulator layers which comprise the μMM assembly 400. High temperature (about 600° C.) commercial borosilicate and alumino silicate glass substrates such as HOYA FLAT PANEL GLASS NA45 and NA35 made by Hoya Corporation USA, San Jose, Calif., having the necessary low TCE (about 37×10$^{-7}$/°C.) may also be suitable.

N-type silicon is particularly suitable due to the widely available processing equipment and methods known for silicon. Quartz may not be as desirable if following layers are formed from other silicon containing materials such as poly silicon as the temperature coefficient of expansion (TCE) is significantly less than that of silicon. A substrate made of Pyrex has a better TCE match to silicon than a substrate made of quartz.

Suitable spacer layer 406 materials are PSG, aluminum, polyimide, spin-on-glass and polysilicon.

With regard to FIG. 4B and 4C, plate to substrate attachment vias are defined in the spacer layer 406 by via walls 410 defined through the spacer layer 406. The via walls 410 form a substrate contact area 411 on the substrate 404 for contact of subsequently deposited layers to bond thereon. A photo lithographic masking step and etching step (e.g., Reactive Ion Etching, (RIE) well known in the art) may be used to define via walls 410 with a high aspect ratio with deep penetration and little lateral undercut through the spacer layer 406.

In a preferred embodiment of the invention as illustrated in FIGS. 4A–G, a plate layer 412 having a thickness Tp, between an inner surface and an outer surface, may be deposited isotropically on the spacer layer 406 to extend down the via walls 410 and onto the substrate contact area 411. The plate layer 412 may be deposited by one of a number of well known deposition processes, such as sputter deposition or electron beam evaporation with planetary rotation of the substrate, to isotropically cover the spacer layer 404, via walls 410 and the substrate contact area 411. Chemical vapor deposition (CVD) may also be used.

Alternative deposition processes may be used for other embodiments of the present invention in cases where isotropic coverage of the spacer, via walls and contact area are of less or no importance.

The plate layer 412 forms a strong mechanical bond with the substrate surface 404 at the contact area 411. In one preferred embodiment of the invention of the μMM assembly 400, the plate layer 412 is an insulating layer of silicon-rich silicon nitride. In a preferred embodiment of the μMM assembly 400 the silicon-rich silicon nitride layer is deposited with sufficient excess silicon proportion to reduce the stress gradient in the plate layer 412 and to more closely match the thermal expansion coefficient of related silicon layers in the μMM assembly 400.

The desired excess silicon proportion is determined by controlling the gas chemistry of the deposition process. See, for example, "Deposition Techniques and Properties of Strain Compensated LPCVD silicon nitride Films", H. Guckel, et al., Technical Digest, IEEE, Solid-State Sensors Workshop, Jun. 2–5, 1986, The refractive index of silicon nitride is related to the TCE of the nitride. The refractive index (Nnit) can be monitored to achieve a requisite TCE of the silicon-rich silicon nitride layer. A preferred value for Nnit is between about 2.1 and 2.5.

A conductive and reflective mirror layer 420 shown in FIG. 4d after a conventional photo lithographic masking step (not shown) and etching step (not shown) well known in the art delineates adjacent, coplanar, electrically isolated mirrors 420-a and 420-b is defined on a mirror plate portion 412-a (defined below) of the plate later 412.

Also defined in the mirror layer definition step are two electrically isolated conductive traces 420-c and 420-d separately connected to the mirrors 420-a and 420-b respectively. The traces 420-c and 420-d are directed distally away from the respective mirrors 420-a and 420-b. The conductive traces 420-c and 420-d proceed distally across respective torsional plate members 416, 418 (further described below) and continue along respective distally disposed portions of plate frame support region 412-b of the plate layer 412 to connect to distally mounted bonding pads (not shown) for subsequent wire bonding, flip-chip bonding, or the like, and for connection to respective control electrodes (not shown) in system 100.

The plate layer 412 is prepared by a mirror plate definition photo lithographic masking and etching step. The mirror plate definition step defines the centrally disposed mirror plate portion 412-a and the distally surrounding frame support portion 412-b by two spaced apart C-shaped apertures 414-a, b defined through the plate layer 412. The C-shaped apertures 414-a, b are disposed with adjacent open ends facing each other. The C-shaped apertures 414-a, b also delineate the torsion members 416, 418 between the adjacent open ends. The two members 416, 418 are disposed as spaced apart, uni-axial, longitudinal torsional plate members 416, 418. The torsional members 416, 418 integrally connect respective opposed sides of the mirror plate region 412-a to two corresponding opposed inner edges of surrounding plate frame region 412-b. The C-shaped apertures 414-a, b also define respective inner edges of the plate frame region 412 spaced away from and proximal to the mirror 412-a. A distal outer edge of the plate frame region 412-*b* may be defined at the same etch step as are the apertures 414-*a, b*.

The uni-axial torsional members 416, 418 are disposed at the opposite edges of the mirror plate region 412-*a* along a central axis thereof. Two adjacent mirror halves 420-*a* and 420-*b* are disposed on either side of the central mirror axis.

With respect to FIG. 4B and FIG. 4C, a substrate electrical contact 413 through the plate to substrate contact 411 may also be defined for later deposited metal trace 422 to make electrical contact with the substrate 402. The metal trace 422 may be deposited and patterned to connect from the substrate 402 (along the plate 412 overlaying one or more of the via walls 410) and to extend distally away from the via 410 to a third bonding pad (not shown) for connection to respective control electrodes (not shown) in system 100.

After photo lithographic definition, the mirror plate 412-*a* is disposed on top of the spacer layer 406. The mirror plate 412-*a* may be released for subsequent rotatable displacement about the mirror central axis by removing a portion of the spacer layer 406 adjacent to and between the mirror plate 412-*a* and the substrate surface 404. A sufficient portion of the spacer layer 406 is removed to form inner spacer layer walls 430 between the plate layer 412 and the substrate surface 404 defining a well aperture 431. The well aperture 431 extends completely beneath the mirror plate 412-*a* and between the mirror plate 412-*a* and the substrate surface 404.

The inner walls 430 of the well aperture 431 are disposed distally along the inside edge of the frame support portion 412-*b*. An outer portion of the spacer layer 406 is also removed at the same time, proceeding proximally along and beneath the distal outer edge of the plate frame region 412-*b* to form outer spacer layer walls 432 between the plate frame region 412-*b* and the substrate surface 404.

The proximal inner and distal outer edges of the plate frame region 412-*b* are spaced apart sufficiently such that a spacer layer field region 434 is defined connecting between a support portion of the plate frame layer 412-*b* and the substrate surface 404. The inner and outer edges of the frame layer 412-*b* defining the field region 434 are preferably spaced apart more than half the largest lateral dimension of the mirror plate 412-*a* in order to ensure that the mirror plate region 412-*a* will be fully released after etching without completely removing the field support region 434.

The spacer layer field region 434 provides a stable supporting structure for the frame layer 412-*b* and, accordingly, for suspension of the torsion members 416, 418 and mirror 412-*a*. The field region 434 of the spacer layer tends to reduce distortion of the torsion members 416, 418 and the mirror plate 412-*a* from several sources. These include: residual stresses within the materials comprising the frame and other cooperating laminar layers, stresses arising from the topology of the frame 412 material over the edges in spacer layer 434 created by spacer walls 410, and bi-metallic forces caused by thermal expansion coefficient mismatches of the different materials comprising the $\mu$MM assembly 400. Any of these can distort the frame 412-*b* and the torsion members 416, 418 connected thereto.

A minimal width for the spacer field region 434 between inner walls 430 and outer walls 432 for one embodiment of the $\mu$MM of FIG. 4A is selected to accommodate residual strain in the plate layer 412 between the outer wall 432 and inner wall 430. A minimal width for the spacer field region 434 between inner walls 430 and outer walls 432 of at least about times the thickness of the plate layer 412 is preferred.

The via walls 410 are preferably located distally from the nearest inner edges of the plate frame support region 412-*b* (which surrounds the mirror 412-*a* and torsion members 416, 418) by at least ½ the largest lateral dimension of the mirror 412-*a* to ensure that a sufficient amount of spacer field region 434 supports the plate support region 412-*b* therebetween. In one embodiment of the $\mu$MM assembly 400, the via walls are located about ½ the largest dimension of the mirror 412-*a* plus about five times the thickness of the plate layer 412, distally away from the respective nearest inner edge of frame 412-*b*.

Alternatively, additional plate 412 to substrate 402 contacts (not shown) may be disposed, adjacently, oppositely or laterally at closer or like spacing from the mirror plate portion 412-*a* and torsion members 416, 418, to provide additional support and strength for the extended plate layer 412 bonded to the substrate 402 at equivalent contacts 411.

With regard to FIG. 4B, it can be shown that alternative structures may be built by extending innermost via walls 410 laterally and longitudinally along the surface of the frame 412 to completely encircle the mirror plate 412-*a* and well aperture 431. Outermost via walls 410 may also be positioned distally away from the central mirror 412-*a* to the very edge of the $\mu$MM assembly 400.

In such an extended via structure, extended electrical contacts 413 and bonding pad metal 422 may be placed at extended points of corresponding extended plate layer 412 periphery.

Removal of portions of the PSG spacer layer 406 as described above may be performed by etching in an isotropic etch (e.g., 49% HF/H$_2$O), through the C-shaped apertures 414-*a, b* until the mirror plate 412-*a* is clear. The isotropic etch also undercuts the PSG 406 at the inner edges and outer edges of the frame plate 412-*b* to form the inner spacer layer walls 430 and outer spacer layer walls 432 respectively.

The PSG etching is stopped before all the PSG spacer layer 406 is removed. A sufficient width of PSG is left between the inside spacer layer walls 432 and the via walls 410 to adequately support the overlaying plate layer 412. This prevents built in stress from the plate to substrate contact 411 and the plate 412 along the via walls 410 from causing distortion of the torsion members 416, 418 and the mirror plate 412-*a*.

A satisfactory width of PSG between the inside walls 432 and the via walls 410 for one preferred embodiment of this invention is at least about five times the thickness of the plate layer 412.

One or more access holes 440 may be defined through the mirror plate 412-*a* at the same time the plate 412 is patterned and etched. Access holes 440 in the mirror plate 412-*a* reduce the required etching time of the spacer layer 406 directly beneath the mirror plate 412-*a* and to more quickly define the well aperture 431 therein. Access holes 440 may also be provided for controlling damping effects as is known in the art.

After releasing the mirror plate 412-*a*, the $\mu$MM assembly 400 is rinsed and dried by conventional means. Rotation of the plane of the mirror plate 412-*a* about the central axis from the plane of the mirror plate frame 412-*b* by an angular displacement, θ, is now subject to restoring torque provided by the torsion members 416, 418.

With reference to FIG. 3 and FIG. 4A, the distal frame region 412-*b* of the $\mu$MM assembly 400 is mounted to the angled face 202 of the slider body 444 by conventional means (e.g., epoxy or the like). The central axis of the mirror plate 412-*a* is aligned with respect to the optical path of the outgoing laser beam 191 such that rotation of the mirror plate 412-a causes the outgoing laser beam 191 to scan back and forth along a radial path 450 of the disk 107, viz, to quickly access adjacent recording tracks (not shown) on the disk.

Separate external electrical connections (not shown) are joined to the conductive traces 420-c and 420-d and to the substrate 402 by conventional means, such as wire bonding, flip chip bonding and the like, to connect to high-speed servo-controlled outputs (not shown) in the system 100 of FIG. 1.

In operation, control voltages are applied by external servo controller outputs (not shown) of the system 100 to the opposed mirror halves 420-a, 420-b with respect to the substrate 402. Appropriate voltages from the external servos applied alternately to one or the other of the mirror halves 420-a, 420-b with respect to the substrate 402, establish electrostatic forces which will cause the mirror plate 412-a to twist about the central axis until restrained by the restoring torque of the torsional members 416, 418.

With reference FIG. 4A, in one embodiment of the present invention the spacer layer 406 is formed of CVD PSG deposited in three separate deposition steps of about ⅓ the total spacer layer thickness for each deposition. Dividing the deposition of the total PSG spacer layer into fractions of the final thickness, about 3 $\mu$m maximum each, reduces cracking or crazing of the spacer layer 406 thereby improving yield.

One or more annealing steps is preferably performed after the PSG layer 406 deposition step. An annealing step provided to the PSG layers 406 before depositing the frame layer 412, relieves intrinsic stresses in the PSG spacer layer and reduces stresses in the subsequently deposited frame layer 412. Reducing stresses in the frame layer 412 improves the flatness of the subsequently formed mirror plate 412-a and improves the yield of mirrors with flatness less than $\lambda/10$.

One embodiment of an annealing step for the PSG layer is a temperature of 850 degree C for about 30 minutes in a nitrogen ambient.

Providing the thick PSG layer of the present invention of about 8 $\mu$m allows surface $\mu$MM assemblies 400 having larger mirrors 412-a to be made. This is because the 8 $\mu$m spacer layer well depth provides an increased lateral extent of a mirror edge for a given maximum angular displacement about the central axis before the edge of maximum lateral extent reaches the critical spacing limit between the edge and the substrate (i.e., about 2 degrees for a mirror 412-a with maximum lateral dimension of about 150 $\mu$m). Larger mirrors 412-a of the present invention also improve MO system 100 reading and recording performance by capturing more of the outgoing 191 and reflected laser beams 192.

Other embodiments of the present invention may use different spacer layer materials. For example, in another embodiment of the present invention the spacer layer 406 may be made of aluminum. With a spacer layer of aluminum, an additional intermediate insulator layer (not shown) is disposed between the conductive N-type silicon wafer substrate 402 and the spacer layer 406. The additional intermediate insulator layer may be, for example, a thermally grown silicon dioxide layer, a CVD deposited silicon dioxide layer or the like.

The isotropic etching of an aluminum spacer layer may be done with a conventional acetic-nitric-phosphoric acid mixture. An additional photo lithographic masking step may be required to protect the mirror layer 420 during the aluminum etching step.

Another embodiment of the present invention may use a polyimide layer as a spacer layer 406. The polyimide may be deposited in one or more spin-on layers as is well known in the art. Etching of the polyimide spacer layer 406 to form the well 431 separating the mirror plate 412-a from substrate 402 may be done in a conventional oxygen rich isotropic plasma etcher, well known in the art as a "barrel etcher." Also in a polyimide spacer layer embodiment, an additional masking step to protect the mirror 420 may be required. Lower temperature deposition steps following the polyimide deposition are required to prevent damage to the polyimide spacer layer material; viz, processes such as E-Beam polysilicon deposition and PECVD deposition of low stress gradient mirror plate material.

Preferred embodiments of the present invention described with regard to FIGS. 4A–4F use pure metals as the mirror layer 420. One embodiment uses gold deposited to between about 50 to 200 nanometer (nm) as the reflective mirror layer 420. A more preferred thickness of gold is about 70 nm. Another embodiment of the present invention incorporates an intermediate layer of chrome between the gold mirror layer 420 and the mirror plate layer 412-a. A preferred thickness of chrome is about 10 nm.

In another embodiment of the present invention, a layer of silver is used as the mirror layer 420 on the mirror plate 412-a. A silver mirror layer thick enough to provide a reflectivity of greater than 90% is about 50 nm. Other metallic conductor materials are less desirable than gold, silver and aluminum, as lower conductivity tends to lower the reflectivity.

Yet another embodiment of the mirror layer is contemplated to be an aluminum layer having a $\frac{1}{2}/\lambda$ dielectric layer disposed on top of the aluminum to improve the reflectivity at the wavelength of interest above 90%.

Layer 412 may optionally be treated with a step of polishing to improve reflectivity.

Still another embodiment of the mirror layer 420 on the mirror plate 412-a is contemplated to be multiple layers of dielectrics deposited in sequentially high-low-high-low refractive indices to provide high reflectivities greater than 90%. See, for example, "Thin Film Optical Filters", 2nd Ed., H. A. Macleod, McGraw-Hill, New York, N.Y.

Other alternative embodiments of the $\mu$MM assembly 400 of FIG. 4A may incorporate an intermediate thermal expansion compensation layer (not shown) deposited between the spacer layer 406 and the mirror plate layer 412 prior to mirror plate layer 412 deposition. The compensation layer may be patterned to generally match the outline of the subsequently delineated mirrors 420-a, b and to have a thickness and temperature coefficient of expansion such that bi-metallic expansion forces between the mirror metals 420-a, b and the compensation layer metal pattern and the mirror plate 412-a will compensate and reduce distortion of the mirrors 420-a, b. A tungsten layer is contemplated as a suitable intermediate thermal expansion compensation layer.

Other embodiments of the $\mu$MM assembly of the present invention may separate the drive electrode function and the mirror function of the mirror electrodes 420-a, 420-b. For example, two alternative spaced apart conductive drive electrodes (not shown) may be deposited and defined on the spacer layer 406 before the mirror plate region 412-a is deposited and patterned. The alternative drive electrodes may be defined in parallel opposition to essentially the same area as a later deposited alternative single overlying mirror (not shown) on the mirror plate 412-a defined in place of mirrors 420-a, 420-b. The alternative single overlying mirror provides the advantage of an increased reflective surface area within outer boundaries of the mirror halves 420-a, 420-b because of the omission of a central space which otherwise separates the mirror halves 420-a, 420-b. The alternative drive electrodes may be electrically connected to corresponding control outputs by additional vias (not shown) through the insulating top plate 412 and alternative distally directed conductive metal traces defined on the plate 412. The alternative drive electrodes may be photo lithographically defined from a tungsten layer deposited on the spacer layer 406.

Another embodiment of the present invention includes a µMM assembly 400 having an additional mirror reinforcing structure for reducing mirror distortion due to thermal expansion coefficient mismatches (bimetallic effects), residual stresses, and/or distortion due to high peak acceleration at high oscillatory rotational rates.

Figure 4E:
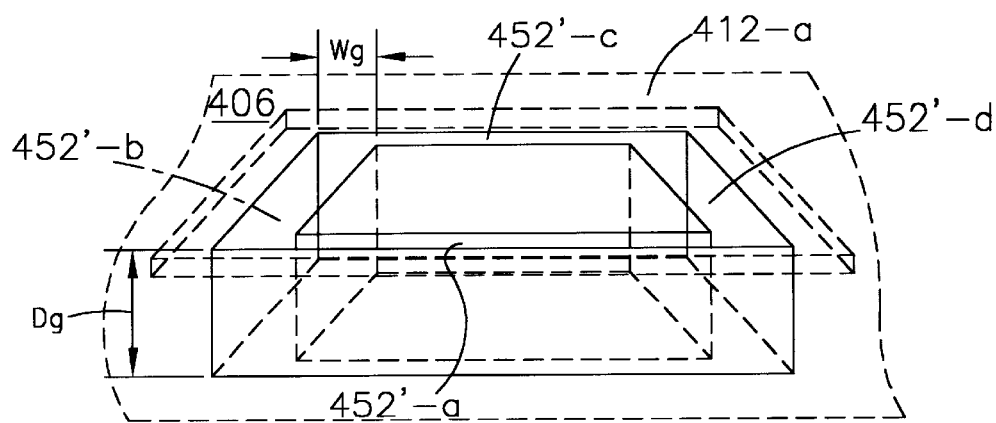
FIG. 4E shows a detail of the grooved spacer layer 414 at an intermediate process step for an alternative reinforced rib embodiment of the mirror plate region of a μMM assembly in accordance with the present invention.
Figure 4F:
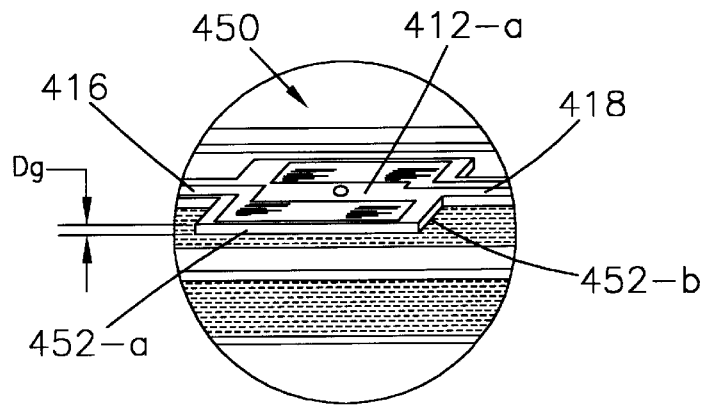
FIG. 4F shows a detail view of the mirror plate region of an alternative reinforced rib embodiment of the μMM assembly in accordance with the present invention.

With respect to FIG. 4E–4F, there is shown an alternative embodiment 450 of the µMM assembly 400 of FIG. 4A in which like reference numbers refer to like elements. The µMM assembly 450 is provided with a reinforcing rib structure 452-a, b, c, d disposed along the perimeter of the mirror 412-a. The µMM assembly 450 has a spacer layer 406 patterned with a plurality of longitudinal grooves 452'-a, b, c, d forming a contiguous quadrilateral trench of width, Wg, and depth, Dg, along the perimeter of the mirror 412-a. The grooves 452'-a, b, c, d are formed before the mirror plate layer 412 is deposited and are located where the periphery of mirror plate 412-a will subsequently be defined (indicated as hatching in FIG. 4E).

The grooves 452'-a, b, c, d may be preferably formed by masking and anisotropic etching steps to produce grooves with corresponding side walls nearly perpendicular to the surface of the spacer layer 406 and with recessed bottoms essentially parallel to the spacer layer 406 surface. Such steps are well known in the art (e.g., RIE etching).

The plate layer 412 is then deposited isotropically (e.g., by chemical vapor deposition), until the desired thickness is achieved. As the plate layer material is deposited isotropically, the thickness of the layer 412 builds up equally on the top surface of the spacer layer 406, as well as along contiguous side walls and recessed bottoms of the grooves 452'-a, b, c, d. The width, Wg, of the grooves 452'-a, b, c, d is selected to be less than about twice the final deposited thickness of the layer 412 so that the layer 412 depositing along walls of the grooves 452'-a, b, c, d closes completely at the outer surface of the layer 412. The width and depth of the grooves 452'-a, b, c, d are selected so that ribs 452 are formed with a sufficiently large depth to width ratio to provide lateral and longitudinal beam bending strength of the mirror plate 412-a significantly increased above that provided by the cross section of an equivalent thickness of unsupported plate layer 412 alone.

The bending strength of a beam (rib) of width, Wg, and depth, Dg, is proportional to the width times the cube of the depth. Thus it can be shown that for two mirrors having an equal mass, a mirror plate provided with peripheral ribs having a width of twice the plate thickness and a depth several multiples of the thickness of the plate will provide a significant increase in bending strength, and thereby a reduction of mirror distortion under equivalent bimetallic or acceleration loads.

The peripheral rib structure 452 provides a mirror 412-a having increased resistance to distortion both laterally and longitudinally over a mirror of the same mass without peripheral ribs. The ribs 452-a, b, c, d provide a mirror plate 412-a having an improved resistance to "bowing" distortions (i.e., convex or concave distortions of the mirror plate 412-a caused by the aforementioned stresses). They also provide resistance to twisting distortions along the plane of the mirror 412-a.

The plurality of ribs 452-a, b, c, d are oriented along the periphery of the mirror 412-a. Other placements of reinforcing ribs 452-a, b, c, d are contemplated, for example, diagonally transverse members associated with diagonal grooves 452-e shown in FIG. 4G, or orthogonal members, bisecting lateral and longitudinal axes of the mirror 412-a associated with grooves 452-f shown in FIG. 4H.

Figure 4G:
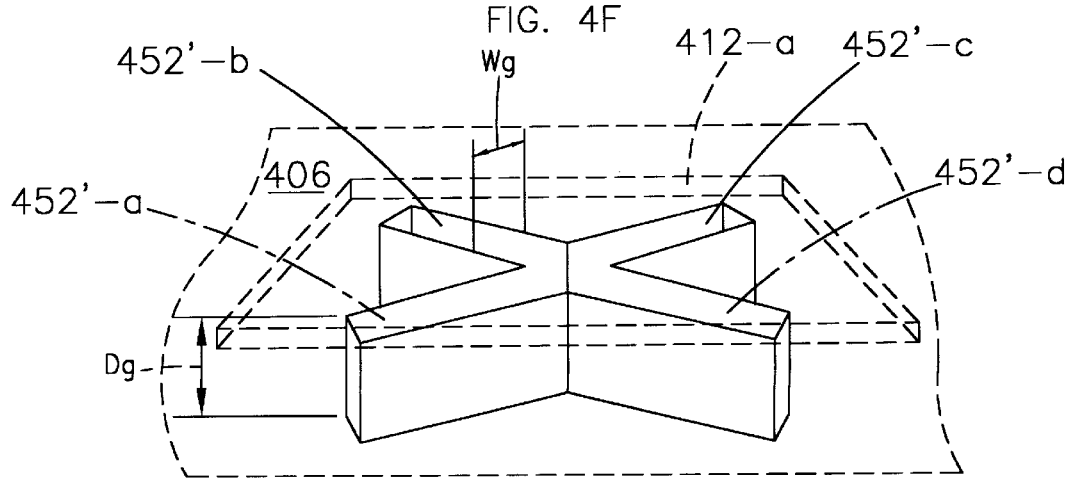
FIG. 4G shows a detail of the grooved spacer layer 414 at an intermediate process step for another alternative reinforced rib embodiment of the mirror plate region of a μMM assembly in accordance with the present invention.
Figure 4H:
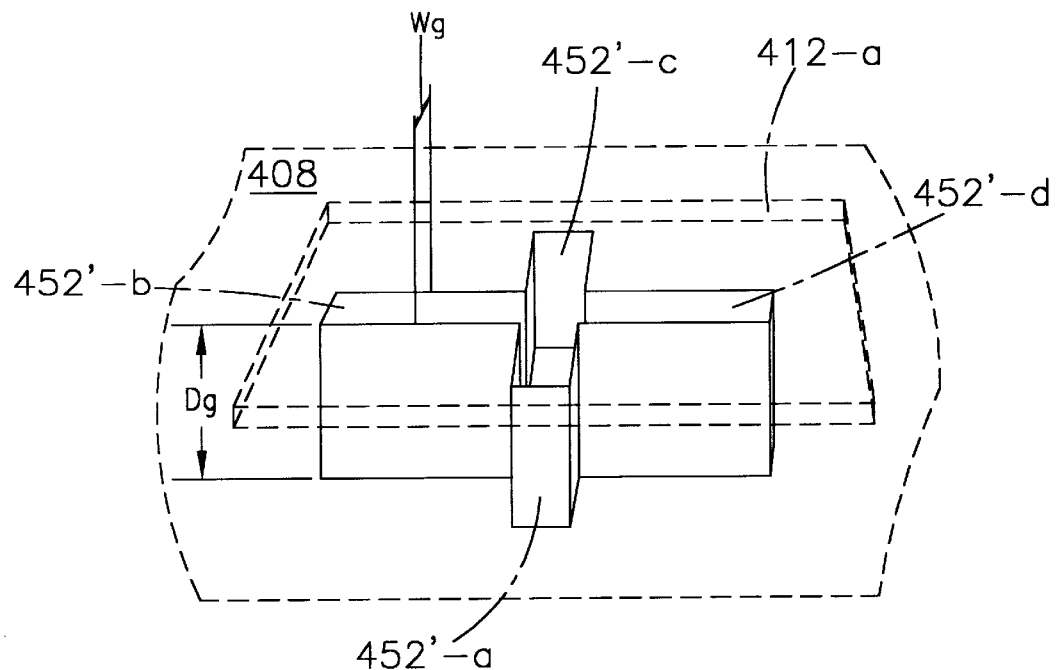
FIG. 4H shows a detail of the grooved spacer layer 414 at an intermediate process step for still another alternative reinforced rib embodiment of the mirror plate region of a μMM assembly in accordance with the present invention.

Positioning grooves 452'-a, b, c, d such as those shown in FIGS. 4G and 4H at other than a periphery is generally problematic for producing mirrors 412-a having the required flatness. Non-peripheral grooves tend to create mirror surfaces having elevation contours (i.e., non-planar surface features). Non-planar surface features caused by non-peripheral grooves may be reduced to an acceptable degree by polishing the surface of the mirror plate 412-a before coating. Polishing may also be used to reduce otherwise unacceptable mirror surface roughness for polysilicon mirror plates. Suitable polishing steps to produce satisfactory surface flatness and surface finish for the required optical characteristics are well known in the semiconductor processing arts.

In the present invention, the deep well 431 (8 µm) allows for the plurality of ribs 452-a, b, c, d along the bottom of the mirror plate 412-a having a depth of several microns while still retaining sufficient spacing between outermost members of the ribs 452-a, b, c, d and the substrate surface 404 when the mirror 412-a is rotated to the maximum extent needed (about 2 degrees). The distal most ribs provide the additional benefit of the function of a stop or bumper to prevent the mirror 412-a from spontaneous deflection to the substrate 404 under inadvertent voltage excess.

A particular preferred embodiment of the present invention incorporating the µMM assembly of FIG. 4F has ribs of depth between about 3 and 7 microns.

Calculating the number and dimensions for the plurality of supporting ribs 452-a, b, c, d required for a particular mirror plate in a µMM assembly of the present invention is a design task suited for a person having ordinary skill in the art.

Another advantage of the embodiments of the present invention incorporating the ribs of FIG. 4A is the additional degree of freedom provided in choosing the lateral dimensions (i.e., length and width) of the torsion members 416, 418 for improving frequency response of the µMM assembly 450, the size, and/or the allowable distortion of the mirror 412-a.

The plurality of reinforcing ribs 452-a, b, c, d may also be incorporated in other embodiments of the present invention by the methods described above.

ALTERNATIVE EMBODIMENTS OF THE PRESENT INVENTION

Figure 4I:
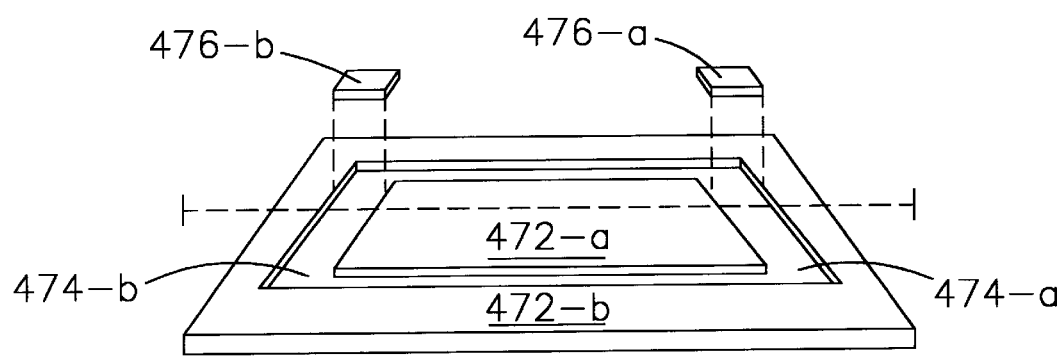
FIG. 4I shows a exploded view of a plate, mirror and torsion member structure for an alternate embodiment of the present invention.

With regard to FIG. 4A and FIG. 4I, an alternative embodiment is shown. The colaminar frame plate 412-b, mirror plate 412-a and torsion members 416, 418 of FIG. 4A are replaced by separate layer elements of FIG. 4I: frame plate 472b, mirror plate 472-a and torsion members 476, 478, respectively. The separate layers constituting elements 472-a, 472-b and 476, 478 may be deposited sequentially and patterned separately. The mirror plate 472-a is disposed centrally within an aperture 474-a, b located within the plate 472-b and supported therebetween by overlapping ends of separately deposited torsion members 476-a, b connected to respective opposite sides of mirror plate 476-*a* and corresponding inner edges of aperture 474-*a*, *b*.

The additional processing steps required may provide additional design freedom to optimize the characteristics of the mirror 472-*a* and torsion members 476-*a*, *b* with respect to operating frequency, rotational displacement range, operating voltage range and mirror stiffness requirements.

Referring again to FIG. 4A, 4B and 4C, yet another embodiment of the present invention may be illustrated by pointing out that the spacer layer 406 may be etched completely away until the plate layer 412 alone provides mechanical support for the frame 412-*b* and mirror 412-*a*. This can be seen by examining the mechanical support provided by the contact 411 between plate 412 and the substrate 402. Such embodiments of the μMM assembly of this invention have increased susceptibility to mirror distortion caused by residual stress in the plate layer 412 and bimetallic thermal stresses, but may provide useful structures in some other applications.

Preferably, more than one plate 412 to substrate 402 contact 411 would be provided in such an embodiment.

Referring again to FIGS. 4A and 4E through 4H, additional stiffening ribs may be incorporated within the frame 412-*b* (not shown) for improved stiffness of the frame 412-*b*. Frame ribs (not shown) having the same width and depth as the ribs 452-*a*, *b*, *c*, *d* may be located along the proximal and distal periphery of frame 412-*b*. Such frame ribs can improve the stiffness and reduce the distortion of the frame subject to the same kind of stresses experienced by the mirror plate 412-*a*. Alternatively, frame ribs may be disposed between proximal and distal peripheries of the frame 412-*b* in a like diagonal and/or orthogonal relationship. Polishing of the frame (in the case of frame ribs) is of less importance as the frame is not cooperating directly in the direction of light by reflecting light along the optical path.

Referring now to FIGS. 5A–5D, there is shown an alternate embodiment of the present storage system invention having a μMM assembly 500 incorporating buried drive electrodes.

A base substrate 502, preferably of N-type Si, is formed with a first planar face 504 and a parallel backside face 506. A substrate insulator layer 508, preferably silicon nitride 200 nm thick, is formed on substrate face 504. A 200 nm layer of conductive polysilicon is deposited on the insulator layer 508. The polysilicon layer is patterned and etched to form first polysilicon conductive electrode 510 on insulator layer 508, and second polysilicon conductive electrode 512 on insulator 508.

An insulating spacer layer 514 of thickness, Ts, preferably about 8 μm, is deposited on electrodes 510, 512 and surrounding insulator 508. Conductor electrode contact vias 516-*a* and 516-*b* for electrical contacts 516-*c*, *d* to polysilicon driver electrodes 510, 512 are defined through the thickness, Ts, of the spacer layer 514 to expose the respective later defined electrical contact 516-*c*, *d* areas on the two electrodes 510, 512.

Figure 5D:
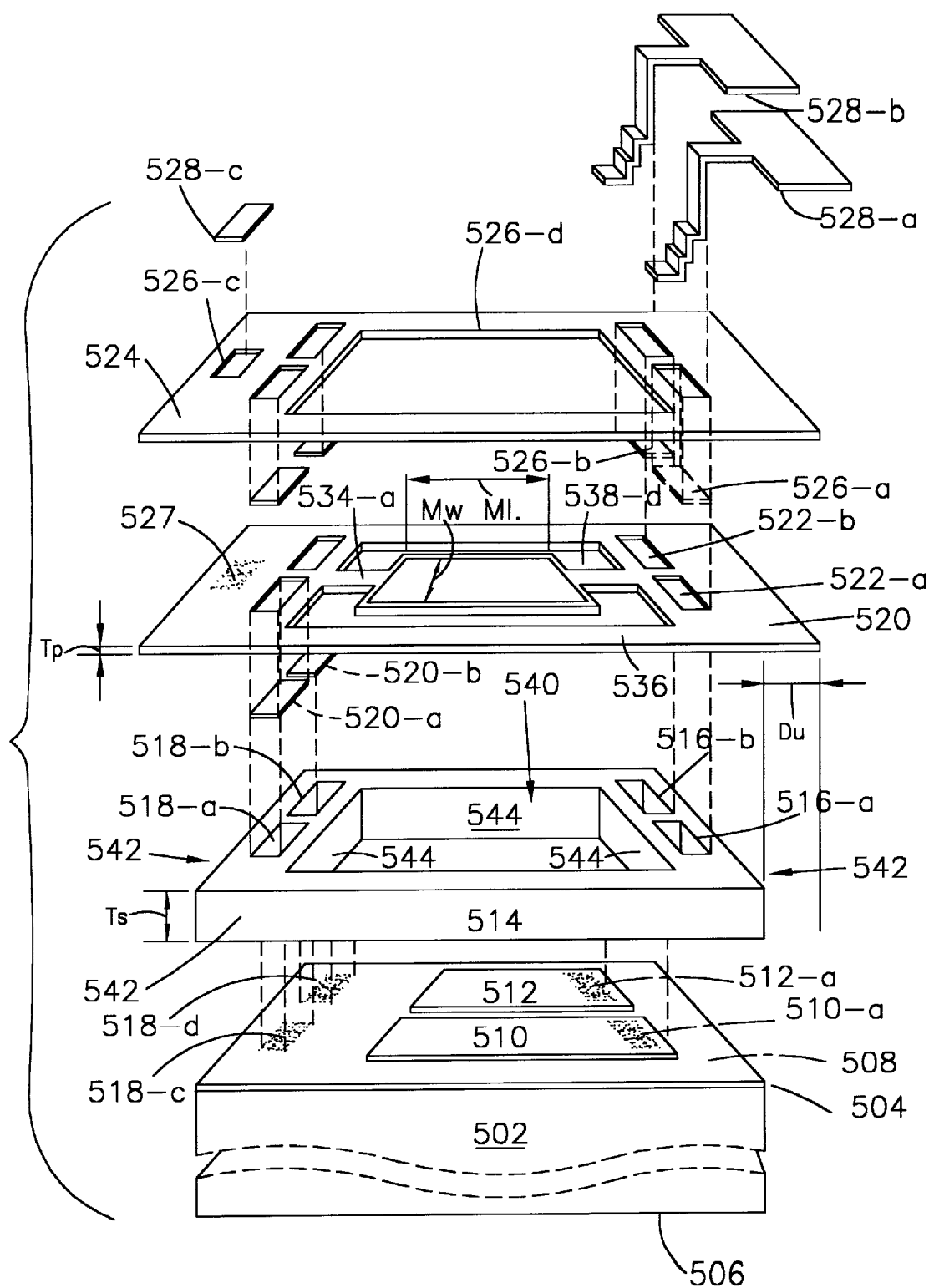
FIG. 5D shows an exploded view of the μMM assembly of FIG. 5A.

With respect to FIGS. 5A and 5D, spacer layer attachment vias 518 *a*, *b* are defined through the spacer layer thickness, Ts, to expose respective spaced apart attachment areas 518-*c*, 518-*d* on substrate insulator layer 508. Attachment areas 518-*c*, *d* provide for subsequently deposited mirror plate 520 to form mechanical attachment to the substrate insulator layer 508 thereon.

The electrode contact spacer vias 516-*a*, *b* and attachment spacer vias 518-*a*, *b*, are defined by suitable conventional photolithographic steps. The mirror plate layer 520 is deposited to contiguously cover the spacer layer 514 and continuously down the vias 516-*a*, *b*, and the vias 518-*a*, *b* to bond with the electrodes 510, 512 at contact areas 510-*a*, 512-*a* and substrate mechanical attachment areas 518-*c*, *d*, respectively.

The plate layer 520 may be deposited isotropically to a thickness, Tp, preferably about 2–3 um thick on the spacer layer 514, the walls of the vias 516-*a*, *b*, walls of the vias 518-*a*, *b*, electrode contact areas 510-*a*, 512-*a*, and mechanical attachment areas 518-*c*, *d*.

In one preferred embodiment of the buried electrode μMM assembly 500, the plate layer 520 is conductive polysilicon. With a conductive polysilicon plate layer 520, the buried drive electrodes 510, 512 can be biased with control voltages to apply electrostatic forces to a torsional mirror later defined from the polysilicon plate layer 520.

Referring to FIG. 5B, plate layer vias 522-*a*, *b* are defined in the plate layer 520. Plate layer vias 522-*a*, *b* are spaced distally away from and surrounding the respective conductor vias 516-*a*, *b*. Plate layer vias 522-*a*, *b* provide for electrical isolation between the conductive plate 520 and subsequently deposited conductive contacts to the electrodes 510, 512.

The plate region 520 is prepared by a process step (e.g., a photo lithographic masking and etching step) to delineate mirror plate region 532, mirror torsion members 534-*a*, *b*, and plate frame region 536 that define C-shaped slots 538-*a*, *b* therethrough. The mirror plate region 532 extends along a central axis therein to a mirror length, Ml, and extends bi-laterally from the central axis to establish mirror width, Mw.

The mirror plate region 532 is disposed in projective alignment with the driver electrodes 510, 512 there below, such that generally equal areas of opposed lateral sides of the mirror 532 about the central axis project equally over the corresponding adjacent driver electrodes 510, 512.

The torsion members 534-*a*, *b* are disposed uni-axially on opposite ends of the mirror, aligned with and extending distally from the central axis of the mirror 532. The torsion members 534-*a*, *b* join integrally with opposed inner edges of the frame 536. The frame 536 extends distally away from, and surrounds the mirror 532, the torsion members 534-*a*, *b* and the slots 538-*a*, *b* to a surrounding distal outer edge.

The frame 536 extends distally along the spacer layer 514, down into and beyond the attachment vias 518-*a*, *b*. Other attachment vias (not shown) of equivalent effect to 518 *a*, *b* may be disposed relative to the mirror 532 in opposed distal relationship to the vias 518-*a*, *b* for additional support for the frame region 536. Additional vias (not shown) may also be disposed laterally in equivalent distal relationship to the mirror 532 and the inner edge of frame 536.

In the polysilicon embodiment of the plate layer 520, the mirror 532 may be the polysilicon itself, either as deposited or after polishing, but preferably having a highly reflective metal coating for the mirror 532.

In the conductive polysilicon plate 520 embodiment of the μMM assembly 500, a plate insulator layer 524 is deposited on top of the plate layer 520 to insulate the plate layer 520 from subsequently deposited conductive traces which connect the drive electrodes 510, 512 to external control voltage sources (not shown).

Referring to FIGS. 5A, 5B, and 5C, layer vias 526-*a*, *b*, *c*, *d* are defined in the insulator layer 524. Vias 526-*a*, *b* allow later deposited conductive pads 528-*a*, *b* to make electrical contact with the buried driver electrodes 510, 512. Layer 524 overlaps plate layer vias 522-*a*, *b* by insulator overlap 530 and prevents shorting of the conductors 528-*a, b* to the plate 520. Via 526-*c* allows conductive contact to the plate layer 520 by later deposited conductive pad 528-*c*. Insulator via 526-*d* opens up access to mirror plate 532 and C-shaped aperture areas 538-*a, b*.

Apertures 538-*a, b* are defined in the mirror plate layer 520 by conventional masking an etching steps. The mirror 532 is released for operation by performing an isotropic etching step of the spacer layer 514 through the apertures 538-*a, b*. The spacer layer etch step removes portions of the spacer layer 514 through the slots 538 and defines an open well region 540. The well region 540 extends between the mirror 532 and the electrodes 510, 512 and between the inner edges of frame 536 and the substrate layer insulator 508. The well 540 is defined by inner walls 544 of spacer layer 514 disposed distally outward along the inner edges of the frame 536, and the substrate insulator layer 508. The walls 544 are displaced by an under cut length, Du.

The spacer layer 514 is also etched along outer edges of the frame layer 536 to define outer walls 542 of the spacer layer 514 displaced inward of the frame layer 536 outer edges by about an equal length, Du. The maximum dimension of the mirror 532 should be less than about twice the undercut length, Du, in order for the well 540 to be completely formed and release the mirror 532.

The inner and outer edges of the frame 536 should be spaced apart more than about twice the undercut length, Du, so that the frame layer 536 can be supported by the remaining spacer layer 514 between the walls 542 and 544.

Alternative conductive pads 528'-*a*, 528'-*b* (not shown) for bonding may be disposed on an alternative embodiment μMM 500' (not shown). In such an alternative μMM assembly 500', the substrate 502 may be extended distally away from the mirror well 540 in one lateral direction to provide support for extended regions of electrodes 510', 512' (not shown) having extended metal contacts 516'-*a, b* (not shown) thereon. Extended electrode regions 510', 512' are disposed sufficiently distal to the mirror well 540 to provide space for bonding pads thereon. Extended vias 516'-*a*, 516'-*b* and 522'-*a*, 522'-*b* (not shown) have distal walls (not shown) disposed distally in a like manner to provide access to extended metal contacts 516'-*a, d* located on the distal extended electrode regions 510', 512', and completely surround bonding pads 538'-*a, b*. In such an alternative embodiment, alternative bonding pads 528;-*a, b* would be disposed directly on the distally extended electrodes 512', 512' on the surface of insulator 508.

Also in such an embodiment, the insulator layer 524 may be dispensed with, since the bonding pads 528'-*a, b* would be completely contained within the extended electrode regions 510', 512', there being no exposed edges of frame layer 520 between the bonding pad 528'-*a, b* and the metal contacts 516'-*c, d*.

In some preferred embodiments of the present invention, PSG is used as the spacer layer 514. Multiple deposition steps of about ⅓ the total spacer layer thickness along with associated anneal steps provides reduced cracking and crazing of the PSG layer.

Multiple depositions may also be used for a spacer layer 514 of spin-on-glass.

The spacer layer 514 etching step in the case of a PSG spacer layer may be an etch in a buffered HF solution as described above. Alternatively, for aluminum or polyimide spacer layers, the appropriate etch is used as described previously.

For a spacer layer 514 of polysilicon the isotropic etch may be performed in a silicon specific etch (e.g., a solution of KOH/H$_2$O or the like). If a spacer layer 514 of polysilicon is used along with a conductive plate layer 520 (e.g., a layer of polysilicon), an additional insulating layer (not shown) may be disposed between the spacer layer 514 and the plate layer 520. In such embodiments, additional via masking and etching steps may be necessary, as is well known by practitioners of the art.

After the mirror 532 is released, the μMM assembly 500 is rinsed and dried by conventional means.

In preferred embodiments of the present invention, the thickness of the μMM assembly 500 may be reduced by a backside thinning step. Referring again to FIG. 5, the backside 506 of the μMM 500 is ground or lapped to reduce the height, Hmm of the assembly. In some embodiments in which multiple μMM assemblies of the present invention are arrayed on large wafers (e.g., 4 inches or more), the thickness, Hmm, may be reduced from 500 to 200 μm or more preferably to 170 μm. This provides a reduction of about 0.3 mm for the overall height of the μMM assembly 500. Such a height reduction is important to provide a corresponding decrease in the spacing required between disks 107 of a multiple disk magneto-optical system 100 as indicated with reference to FIG. 1 and a subsequent increase in system volumetric data storage capacity. The beneficial reduction in overall height, Hmm, generally increases as the diameter of wafers is increased, since larger wafers are generally thicker to begin with. In a similar manner, a height reduction of the μMM assembly shown in FIG. 4A is an alternative embodiment of the present invention.

After thinning, the μMM assembly 500 is aligned and attached to the angled face 202 of the slider body 444 as shown in FIGS. 2 and 3 by bonding the frame 536 to the face 202 with epoxy or the like. Before attachment to the flying MO head 106, subsequent bonding the conductive patterns 528-*a, b, c* may be made by wire bonding to conductive wires (not shown) on the head 106 leading to control outputs (not shown) located distally in system 100.

Alignment marks (not shown) may be placed on the back surface 506 of the thinned μMM assembly to help in registration of the μMM 500 to the slider face 202 during later assembly.

An embodiment of the present invention can also incorporate a surface mount attachment by providing respective bonding lands (not shown) on the face 202 for receiving the conductive patterns 528-*a, b* and 528-*c*. The step of aligning and bonding the μMM assembly to the flying MO head 106 can then be performed in one step.

An alternative preferred embodiment of the buried electrode μMM assembly 500 may be formed with a metal as the plate layer 520 (e.g., gold). A metal may be suitable if the processing temperatures following the metal deposition are sufficiently low. Polysilicon and silicon nitride match the expansion coefficients of the other materials more closely, however.

An alternative embodiment of the buried electrode μMM assembly 500 with a polysilicon mirror plate 520 may use a metal layer, for example: gold, silver or aluminum, or a multi-layer dielectric layer deposited on the polysilicon mirror 532.

In another alternative embodiment of the present invention, the μMM assembly of FIG. 5 may optionally have the plate layer 520 formed of silicon-rich silicon nitride as described with respect to FIG. 4. In the case of an (insulating) silicon nitride frame and mirror region 532, the μMM assembly 500 may have a conductive mirror layer (not shown) on the mirror plate 532 projecting over the buried electrodes 510, 412. Another conductive trace (not shown) deposited and patterned on the plate 532 may be connected from the conductive mirror layer to the bonding pad 528-c. The conductive mirror on region 532 may then be in electric communication with a remote control output (not shown) through pad 528-c and with the driver electrodes 510, 512 connected to other remote control outputs. The conductive mirror and mirror region 532 may then be electrostatically rotated by control voltages on the driver electrodes 510, 512.

Application of the μMM devices and methods of the present invention are not restricted to magneto-optical data recording and retrieval systems. The structures and methods of this invention may also be incorporated in magnetic recording and retrieval systems by using the μMM as part of optical signal detection apparatus for servo control of slider head location relative to a magnetically recorded track. For example, by optically detecting position related changes of magnetic intensity and magnetic domain transitions.

The μMM assembly of the present invention also has application in other non-magnetic media recording and retrieval systems. One application is in retrieving optical information from media using physical recording methods (e.g., CD-ROMs having data recorded as physical pits or depressions for reflecting and modulating the phase or intensity of a beam of incident light). The μMM assembly of the present invention may also have application in retrieving optical data from media having data storage locations providing optical phase modulation in the absence of magnetic fields.

While the foregoing detailed description has described embodiments of the μMM assembly in accordance with this invention, it is to be understood that the above description is illustrative only and not limiting of the disclosed invention. It will be appreciated that it would be possible to modify the size, shape and appearance and methods of manufacture of various elements of the invention or to include or exclude various elements within the scope and spirit of this invention.

The drive electrodes of alternate embodiments of the μMM of the present invention may be formed in laminar proximity on the top, the bottom or both surfaces of the mirror plate, or may alternatively be formed in laminar proximity to the substrate, in contiguous contact or separated therefrom by suitable insulator layers, if required. The spaced apart electrostatically cooperating common electrode may conversely be disposed in proximal laminar relationship to the opposite one of the mirror plate or substrate members. Examples of additional interposed insulator layers between alternative conductive spacer and substrate materials have been described which can be used to form alternate μMM embodiments of the present invention. Thus the invention is to be limited only by the claims as set forth below.

What is claimed is:

1. A magneto-optical data storage system comprising a laser source which emits a laser beam, a magneto-optical disk having a data storage location and a flying optical head having a slider body and a surface micro-machined mirror assembly mounted on the slider body for directing the laser beam onto the data storage location, the surface micro-machined mirror assembly including:

a base substrate having a surface;

first and second electrodes disposed on the surface of the base substrate;

a spacer layer disposed on the base substrate and being provided with an opening for exposing the first and second electrodes through the spacer layer;

a frame layer disposed on the spacer layer;

a reflective plate overlying the opening; and pivot means for pivotably coupling the reflective plate to the frame layer for pivotal movement about an axis whereby the first and second electrodes pivot the reflective plate between first and second positions about the axis to permit fine tracking on the magneto-optical disk.

2. The data storage system as set forth in claim 1 for use with a laser beam having a wavelength $\lambda$ wherein the reflective plate has a surface flatness on the order of less than $\lambda/10$.

3. The data storage system as set forth in claim 1 wherein the frame layer and the reflective plate are coplanar.

4. The data storage system as set forth in claim wherein the pivot means includes first and second torsional members.

5. The data storage system as set forth in claim 3 further comprising a coil of an electrically conductive material carried by the slider body for creating a magnetic field at the data storage location.

6. The data storage system as set forth in claim 4 wherein the first and second torsional members connect between two spaced apart support points of an inner edge of the frame layer and corresponding support points on opposite ends of the reflective plate.

7. The data storage system as set forth in claim 6 wherein the axis comprises a central axis bisecting the reflective plate.

8. The data storage system as set forth in claim 1 wherein the substrate is made for a material selected from the group consisting of silicon, quartz and low expansion coefficient glass.

9. The data storage system as set forth in claim 1 wherein the reflective plate has an inner surface and includes a plurality of stiffening ribs projecting from the inner surface of the reflective plate for increasing the stiffness of the reflective plate.

10. The data storage system as set forth in claim 1 wherein the reflective plate has an inner surface, a compensating layer of material is disposed on the inner surface of the reflective plate, the compensating layer having a selected thickness and thermal expansion coefficient for reducing bi-metallic distortion of the reflective plate with temperature change.

11. The data storage system as set forth in claim 1 wherein the reflective plate has at least one layer made from metal.

12. The data storage system as set forth in claim 11 wherein the metal is selected from the group consisting of gold, aluminum and silver.

13. The data storage system as set forth in claim 1 wherein the reflective plate has a coating of a ½ wavelength thick dielectric material.

14. The data storage system as set forth in claim 1 wherein the reflective plate includes a stack of dielectric layers having refractive indices selected to produce a reflectivity above 90%.

15. The data storage system as set forth in claim 1 wherein the spacer layer is made from a material selected from the group consisting of phosphosilicate glass, aluminum, polyimide, spin-on-glass and polysilicon.

16. The data storage system as set forth in claim 15 wherein the spacer layer is formed from a plurality of layers of phosphosilicate glass.

17. The data storage system as set forth in claim 1 wherein the reflective plate comprises an insulator.

18. The data storage system as set forth in claim 11 wherein the insulator comprises silicon-rich silicon nitride.

19. The data storage system as set forth in claim 1 wherein the reflective plate includes a layer of polysilicon.

20. The data storage system as set forth in claim 19 for use with a laser having a wavelength $\lambda$ wherein the layer of polysilicon has a flatness of about $\lambda/10$.

21. The data storage system as set forth in claim 20 wherein the layer of polysilicon includes a first polished layer of polysilicon and a second layer of polysilicon disposed on the first layer of polysilicon.

22. A flying optical head for use in a data storage system having a laser beam and having a magneto-optical disk with a data storage location comprising a slider body, a surface micro-machined mirror assembly carried by the slider body adapted for reflecting the laser beam onto the data storage location, the surface micro-machined mirror assembly including:
- a base substrate having a surface;
- first and second electrodes deposited onto the surface of the base substrate;
- a spacer layer deposited onto the base substrate and being provided with an opening for exposing the first and second electrodes through the spacer layer;
- a frame layer deposited onto the spacer layer;
- a reflective plate overlying the opening; and
- pivot means for pivotably coupling the reflective plate to the frame layer for pivotal movement about an axis whereby the first and second electrodes pivot the reflective plate between first and second positions about the axis.

23. The head as set forth in claim 22 for use with a laser beam having a wavelength $\lambda$ wherein the reflective plate has a surface flatness on the order of less than $\lambda/10$.

24. The head as set forth in claim 23 wherein the first and second torsional members connect between two spaced apart support points of an inner edge of the frame layer and corresponding opposed support points on opposite ends of the reflective plate.

25. The head as set forth in claim 24 wherein the axis comprises a central axis bisecting the reflective plate.

26. The head as set forth in claim 22 wherein the frame layer and the reflective plate are coplanar.

27. The head as set forth in claim 26 wherein the pivot means includes first and second torsional members.

28. The head as set forth in claim 22 further comprising a coil of an electrically conductive material carried by the slider body for detecting or creating a magnetic field at the data storage location.

29. The head as set forth in claim 22 wherein the reflective plate has an inner surface and includes a plurality of stiffening ribs projecting from the inner surface of the reflective plate for increasing the stiffness of the reflective plate.

30. A flying optical head for use in a data storage system having a laser beam with a wavelength $\lambda$ and having an optical disk having a data storage location comprising a slider body, a surface micro-machined mirror assembly mounted on the slider body for reflecting the laser beam onto the data storage location, the surface micron-machined mirror assembly comprising:
- a surface micro-machined base;
- a surface micro-machined frame layer attached to the base in a position spaced above the base; and
- a surface micro-machined mirror pivotably coupled to the frame layer, the mirror having a surface flatness on the order of less than $\lambda/10$.

31. The head as recited in claim 30 further comprising a surface micro-machined spacer layer disposed between the base and the frame layer.

32. The head as recited in claim 30 wherein the surface micro-machined mirror assembly further comprises drive means for pivoting the mirror between first and second positions relative to the frame layer.

* * * * *